US008797932B2

(12) United States Patent  
Cowan et al.

(10) Patent No.: US 8,797,932 B2
(45) Date of Patent: Aug. 5, 2014

(54) MANAGING POWER STATES IN NETWORK COMMUNICATIONS

(75) Inventors: Anthony J. Cowan, Ocala, FL (US); Patrick Kung Mong Tse, Toronto (CA)

(73) Assignee: QUALCOMM Incorporated, San Diego, CA (US)

(*) Notice: Subject to any disclaimer, the term of this patent is extended or adjusted under 35 U.S.C. 154(b) by 862 days.

(21) Appl. No.: 12/688,357

(22) Filed: Jan. 15, 2010

(65) Prior Publication Data

US 2011/0176463 A1 Jul. 21, 2011

(51) Int. Cl.
*G08C 17/02* (2006.01)
*H04W 52/02* (2009.01)

(52) U.S. Cl.
CPC .................. *H04W 52/0216* (2013.01)
USPC ........................................ 370/311

(58) Field of Classification Search
CPC ............ H04W 52/0216; H04W 52/02; H04W 52/0219; H04W 72/12
USPC ......... 370/310, 311, 315–318; 455/73, 550.1, 455/572, 574
See application file for complete search history.

(56) References Cited

U.S. PATENT DOCUMENTS

| | | | |
|---|---|---|---|
| 6,473,607 B1 * | 10/2002 | Shohara et al. ............ 455/343.1 |
| 7,412,265 B2 * | 8/2008 | Chen et al. .................... 455/574 |
| 7,647,078 B2 * | 1/2010 | Kim et al. ...................... 455/574 |
| 7,876,721 B2 * | 1/2011 | Nath ............................... 370/318 |
| 7,912,467 B2 * | 3/2011 | Yoon et al. .................. 455/435.1 |
| 2003/0119503 A1 * | 6/2003 | Shohara et al. ............... 455/434 |
| 2006/0099980 A1 * | 5/2006 | Nielsen et al. ............... 455/507 |
| 2008/0037570 A1 * | 2/2008 | Kim et al. ...................... 370/406 |
| 2009/0296617 A1 * | 12/2009 | Lin et al. ....................... 370/311 |
| 2010/0312909 A1 * | 12/2010 | Diab .............................. 709/238 |
| 2010/0313050 A1 * | 12/2010 | Harrat et al. .................. 713/323 |

OTHER PUBLICATIONS

Liu, Jiayang et al. "Micro Power Management of Active 802.11 Interfaces." MobiSys'08, Jun. 17-20, 2008, Breckenridge, Colorado, 2008, 14 pages.

Rohl, Christian. "A Short Look on Power Saving Mechanisms in the Wireless Lan Standard Draft IEEE 802.11," Technical University Berlin, Telecommunication Network Group, available before Jun. 2001, downloaded on Jan. 15, 2010, 6 pages.

* cited by examiner

*Primary Examiner* — Chi Pham
*Assistant Examiner* — Robert Lopata
(74) *Attorney, Agent, or Firm* — DeLizio Gilliam, PLLC

(57) ABSTRACT

Controlling a power state of a communications device includes: receiving over a network at a communications device in a low-power mode from a scheduling device an assignment of a power state schedule indicating one or more intervals to enter an active state period and one or more intervals to enter a sleep state period; and during an active state period at the communications device, receiving over the network from a second communications device aware of the power state schedule a request that the communications device exit the low-power mode.

19 Claims, 8 Drawing Sheets

MANAGING POWER STATES IN NETWORK COMMUNICATIONS

TECHNICAL FIELD

This description relates to relates to managing power states in network communications.

BACKGROUND

Communications networks allow electronic communications devices to transmit and receive data over physical media. Some networks use a dedicated medium such as twisted-pair wire, while others use media such as coaxial cable or power lines shared with other systems, and even others are wireless systems using radio frequency (RF) signals or other wireless signals. These networks all allow some form of point-to-point communication between devices or stations, often with intermediate junctions such as hubs, routers, and base stations.

SUMMARY

In one aspect, in general, a method for controlling a power state of a communications device includes: receiving over a network at a communications device in a low-power mode from a scheduling device an assignment of a power state schedule indicating one or more intervals to enter an active state period and one or more intervals to enter a sleep state period; and during an active state period at the communications device, receiving over the network from a second communications device aware of the power state schedule a request that the communications device exit the low-power mode.

Aspects can include one or more of the following features.

An active state period of the communications device overlaps with an active state period of the second communications device.

The second communications device has been assigned a power state schedule by the scheduling device.

A desired maximum response time is equal to the sum of the active state period and the sleep state period.

The length of an active state period is based on a desired level of power consumption.

The method further comprises sending from the communications device to the scheduling device an indication that the communications device is entering the low-power mode.

The method further comprises receiving at the communications device from the scheduling device an approval to enter the low-power mode.

The method further comprises receiving at the communications device from the scheduling device information about a power state schedule of one or more other communication devices.

The method further comprises, during an active state period, receiving over the network at the communications device from the scheduling device a request that the communications device exit the low-power mode.

The method further comprises receiving at the communications device a central beacon from the scheduling device indicating the low-power mode status of one or more other communications devices on the network.

The central beacon indicates the active state status of one or more other communications devices on the network The central beacon indicates the sleep state status of one or more other communications devices on the network The method further comprises receiving at the communications device an indication from the scheduling device of the active state periods of one or more other communications devices on the network.

The method further comprises, at the scheduling device, determining that all communications devices have entered a sleep state period; and entering a sleep state period.

Determining is based on power state schedules assigned to the communications devices.

The method further comprises, at the scheduling device, exiting the sleep state period when a communications device exits a sleep state period.

The method further comprises, at a third communications device, entering a low-power mode based on an event other than a network communication from the scheduling device.

The event is the receipt of a network communication from a device other than the scheduling device indicating that the device other than the scheduling device has entered a low-power mode.

In another aspect, in general, a network comprises a scheduling device; and a communications device in communication with the scheduling device, configured to receive, in a low-power mode, an assignment of a power state schedule from the scheduling device, the power state schedule indicating one or more intervals to enter an active state period and one or more intervals to enter a sleep state period, and receive, during an active state period, a request that the communications device exit the low-power mode from a second communications device aware of the power state schedule.

Among the many advantages of the invention (some of which may be achieved only in some of its various aspects and implementations) are the following.

Network devices in a low-power mode can be activated to a full-power mode at predictable time intervals. The amount of power a network device consumes can be optimized while satisfying any constraints of network response time. A network device can be made aware of the power state status of another network device. Network devices can activate other network devices in a low-power mode, and network devices in a low-power mode can be activated by other network devices.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
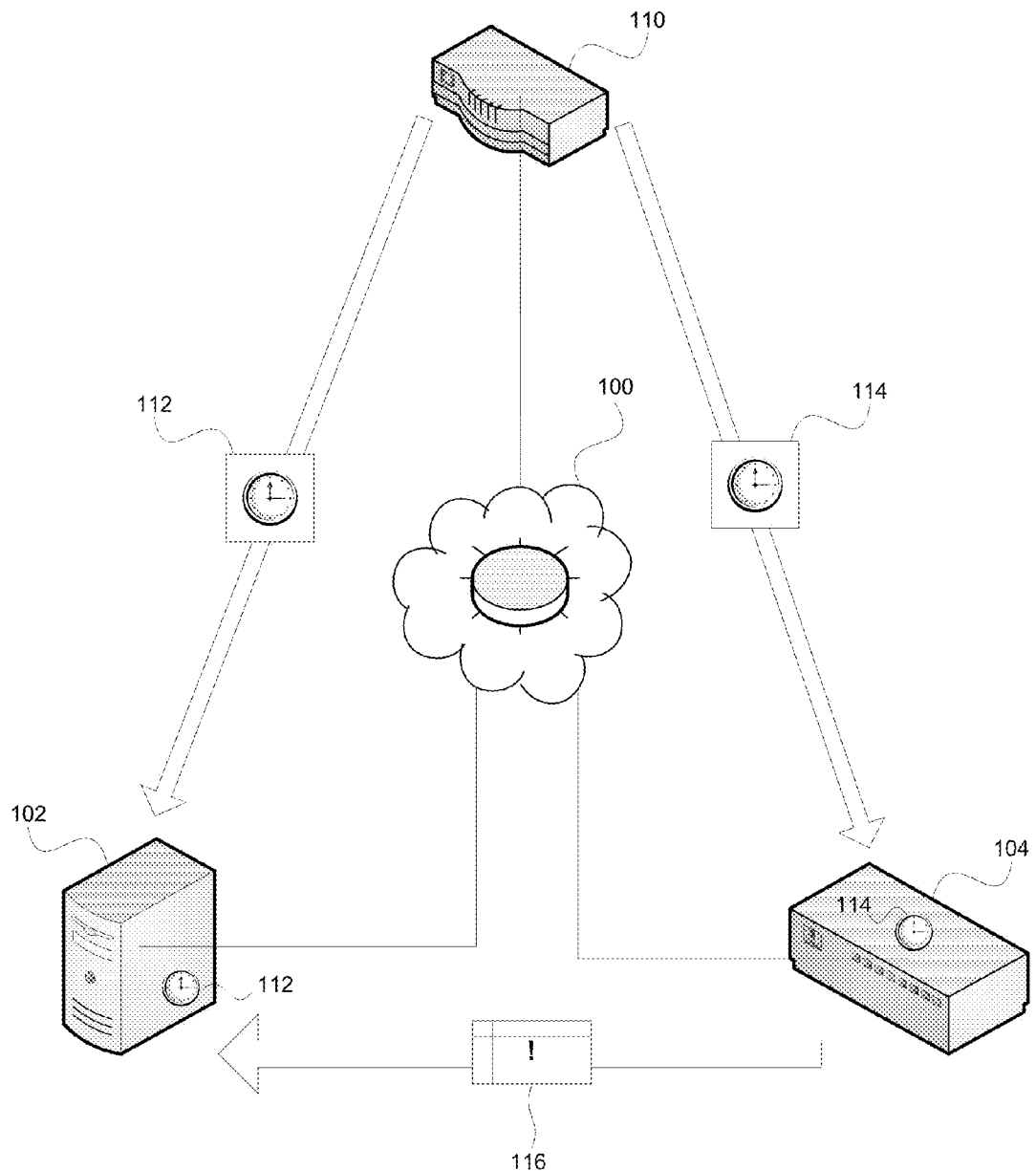
FIG. 1 shows a communications network with coordinated power state schedules.

FIG. 1 shows an exemplary configuration for a network 100 in which power states are managed to conserve power.

The communications devices 102, 104 on the network 100 can operate in one of multiple power modes. When the communications devices 102, 104 operate in a full-power mode, the communications devices might perform computation tasks or send and receive network data. When the communications devices 102, 104 are in a low-power mode such as "power-save" mode, the communications devices draw less power than in full-power mode, saving on energy used by the communications devices over the course of their operation.

A power-save mode may be associated with multiple power states. For example, a communications device 102 in a power-save mode could be in a sleep state, in which many of the communications device's components are powered off and the communications device draws little power, or the communications device could be in an active state, in which at least some of the communications device's components are powered on. If the communications device 102 is in the sleep state of a power-save mode, the components for network communications might be among the powered-off components, and the communications device would be unable to send or receive communications from the network while in the sleep state. The network communications components could be powered on during the active state of the power-save mode so the communications device 102 can receive network communications during the active state. If the power-save mode alternates between the sleep state and the active state in a regular cycle, the communications device 102 will be in the active state, and thus available for network communications, at predictable intervals.

To control the amount of power consumed in power-save mode, a communications device can periodically cycle or switch between the active state and sleep states. The duty-cycle of the switching can be selected based on one or more factors. For example, the duty-cycle can be low enough to keep the power under a predetermined limit or the duty-cycle can be high enough to keep the response time of a device under a predetermined limit, where the response time is the amount of time a communications device takes to respond to "wake events" from the network requesting that the device activate or "wake up" from power-save mode. The response time is a function of the sleep state time and active state time selected. In some implementations, the communications device and/or power management controller (e.g., the scheduling device) are configured to select absolute and relative durations of the active state time and sleep state time to manage the desired average power consumption and the desired response time. Minimizing the ratio of active state time to sleep state time minimizes the communications device's average power-save mode power consumption, but may increase the response time. Conversely, maximizing the ratio of the active state time to the sleep state time minimizes the response time, but may increase the communications device's average power-save mode power consumption.

During the sleep state the communications device may or may not be able to detect wake events depending on which portions of the communication device remain functional during the sleep state. In some implementations, after the communications device transitions from the sleep state to the active state, the communications device can be notified that a wake event occurred during the sleep state and the device can leave the power-save mode so it will not transition back into the sleep state after the active state time period. In the case where all portions of the communications device are powered off during the sleep state, the worst-case response time is the sum of the sleep state time and a portion of the active state time that is required to restore functionality to the communications device required for responding to wake events. When the minimum active state time is equivalent to the amount of time required to restore functionality to the communications device necessary to detect wake events, the worst-case response time is the sum of the sleep state time and the active state time. By controlling both the duty cycle and the period, the communications device is able to satisfy constraints on the average power-save mode power consumption and constraints on the response time.

The network 100 shown in FIG. 1 includes a scheduling device 110 that generates power state schedules 112, 114 for the communications devices 102, 104 and assigns the schedules to the communications devices. In some implementations, the scheduling device 110 is a stand-alone device, or integrated with another device, such as a network router, broadband gateway, or other device having communications functionality.

The power state schedules 112, 114 indicate the times at which each communications device 102, 104 in a power-save mode should enter a sleep state and the times at which each communications device should enter an active state. In some implementations, the times could be absolute times based on a common clock or time reference and synchronized among communications devices 102, 104 and the scheduling device 110. In some implementations, the times could be schedule intervals, where a change in power state occurs relative to the last change in power state. In some implementations, the power state schedules 112, 114 are identical for some or all of the communications devices 102, 104. In some implementations, each communications device 102, 104 has a unique power state schedule 112, 114.

Because the communications devices 102, 104 have assigned power state schedules, the communications through the network 100 can be coordinated with the power states of each communications device. For example, a communications device 104 preparing to communicate with another communications device 102 might determine that the other communications device is in a coordinated power-save mode. Before proceeding further, the communications device 104 can consult the schedule 112 of the other communications device 102. In some implementations, the communications device 104 might acquire the schedule 112 from the scheduling device 110. In some implementations, the communications device 104 might already have received the schedule 112 from the scheduling device 110 or the other communications device 102 or another device. For example, the schedule 112 might have been provided in a central beacon broadcast to the network. In some implementations, the schedule 112 is provided in real time by a central beacon, and the central beacon indicates which communications devices are currently in an active state and which communications devices are currently in a sleep state.

The schedule 112 indicates to the communications device 104 when the other communications device 102 is in a sleep state and when the other communications device is in an active state. The communications device 104 can use this information to determine when to communicate with the other communications device 102. If the schedule 112 indicates that the other communications device 102 is in an active state, the communications device 104 can send the other communications device a request 116 to exit power-save mode and to enter a full-power mode, for example. If the schedule 112 indicates that the other communications device 102 is in a sleep state, the communications device 104 can wait to send the request 116 until the schedule indicates that the other communications device 102 has exited the sleep state and entered an active state. The receipt of the request 116 is an example of a wake event.

Figure 2:
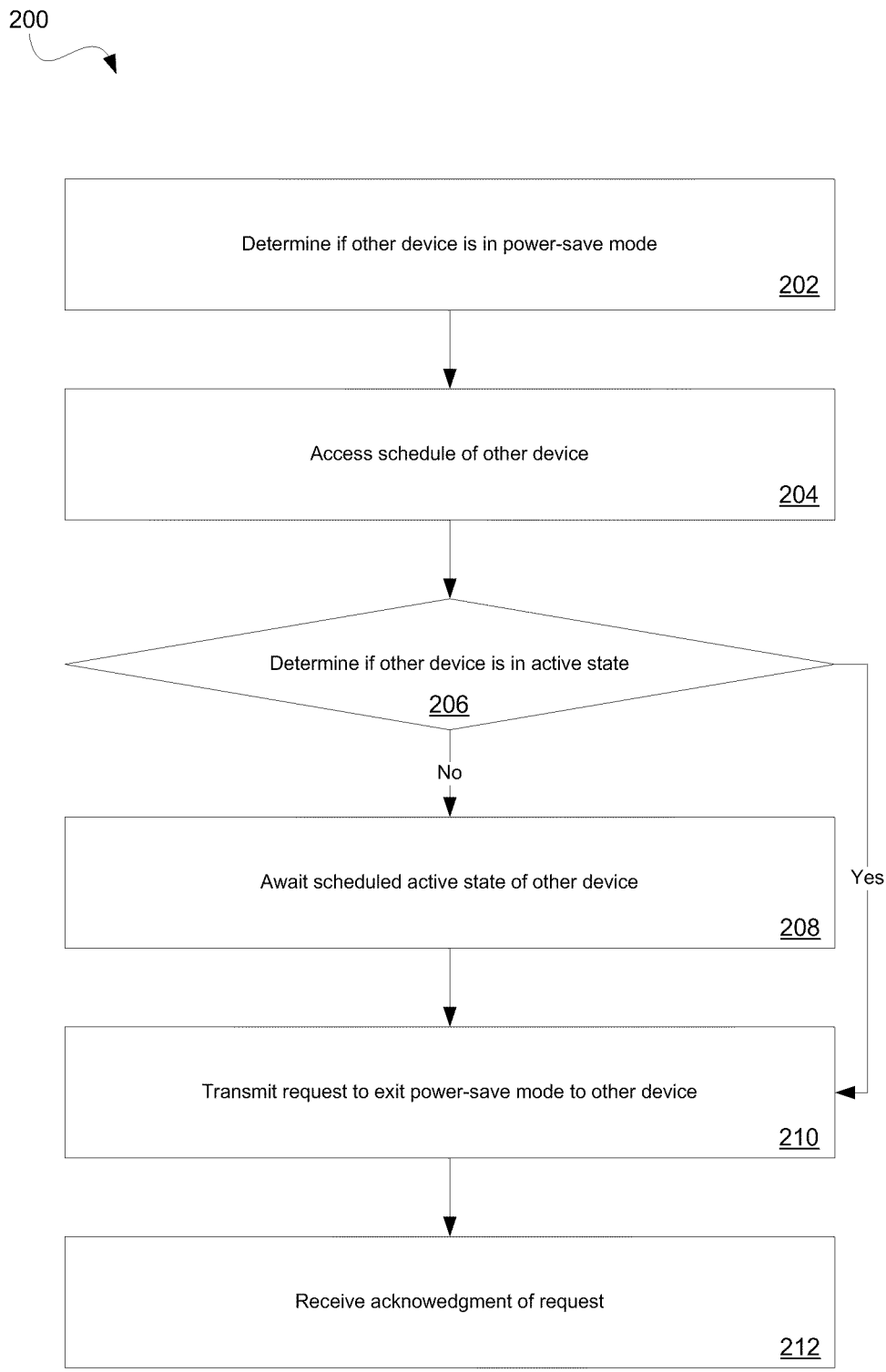
FIGS. 2-3 show flowcharts of the operation of a communications device.

FIG. 2 is a flowchart 200 showing a sequence of operations that a communications device 104 can perform to communicate with another communications device 102. The communications device determines 202 if the other device is in power-save mode, for example, by consulting a central beacon containing the power-save status of other devices. The communications device also accesses 204 the power state schedule of the other device. If the other device is in power-save mode, the communications device determines 206 if the other device is in an active state according to the schedule. If the other device is not in an active state, the communications device awaits 208 the next scheduled active state of the other device. If the other device is in an active state, the communications device transmits 210 a request to the other device to exit power-save mode. Once the communications device receives 212 acknowledgment of the request, the two devices can communicate further.

Figure 3:
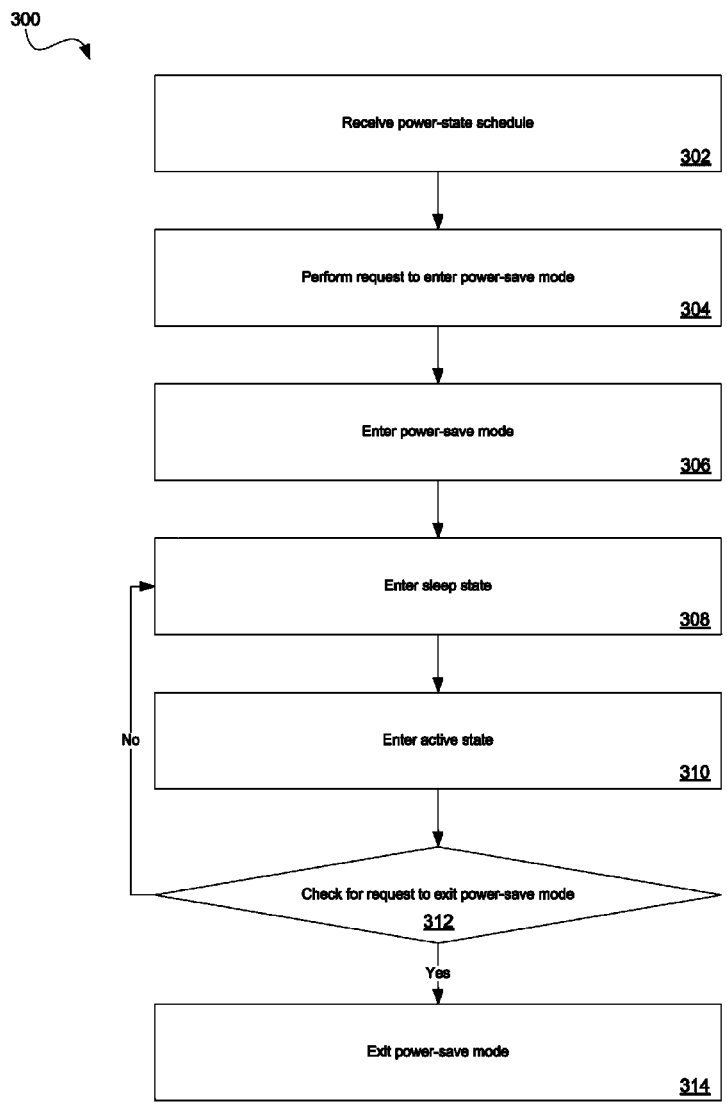

FIG. 3 is a flowchart 300 showing the sequences of operations that a communications device 102 can perform to utilize a power-save mode. The communications device receives 302 a power state schedule 112, for example, from a scheduling device 110. The communications device also performs 304 a request to enter power-save mode, for example, by sending the request to the scheduling device 110 and receiving approval. The communications device enters 306 power-save mode. In power-save mode, the communications device enters 308 a sleep state according to the received schedule 112. As part of the power-save mode state cycle, the communications device enters 310 an active state. In the active state, the communications device checks 312 for a request to exit power save mode from another device such as another communications device 104. If the communications device has received a request, the communications device exits 314 power-save mode. If the communications device has not received a request, the communications device enters 308 a sleep state at the conclusion of the active state time interval.

Another example of a power-save mode is an uncoordinated power-save mode, in which devices choose to enter power-save mode at any time without coordinating with a scheduling device 110 or other communications devices 102, 104. A communications device in uncoordinated power-save mode may periodically scan or check for traffic from other communications devices 116 to exit the power-save mode. The communications device may process local events such as expiration of an internal timer or other events generated by one or more host devices or accessory devices physically connected to the communications device. When a communications device exits uncoordinated power-save mode, it might authenticate with the network again as if a new member. A network 100 can have some communications devices operating in a coordinated power-save mode and some communications devices operating in an uncoordinated power-save mode.

Figure 4:
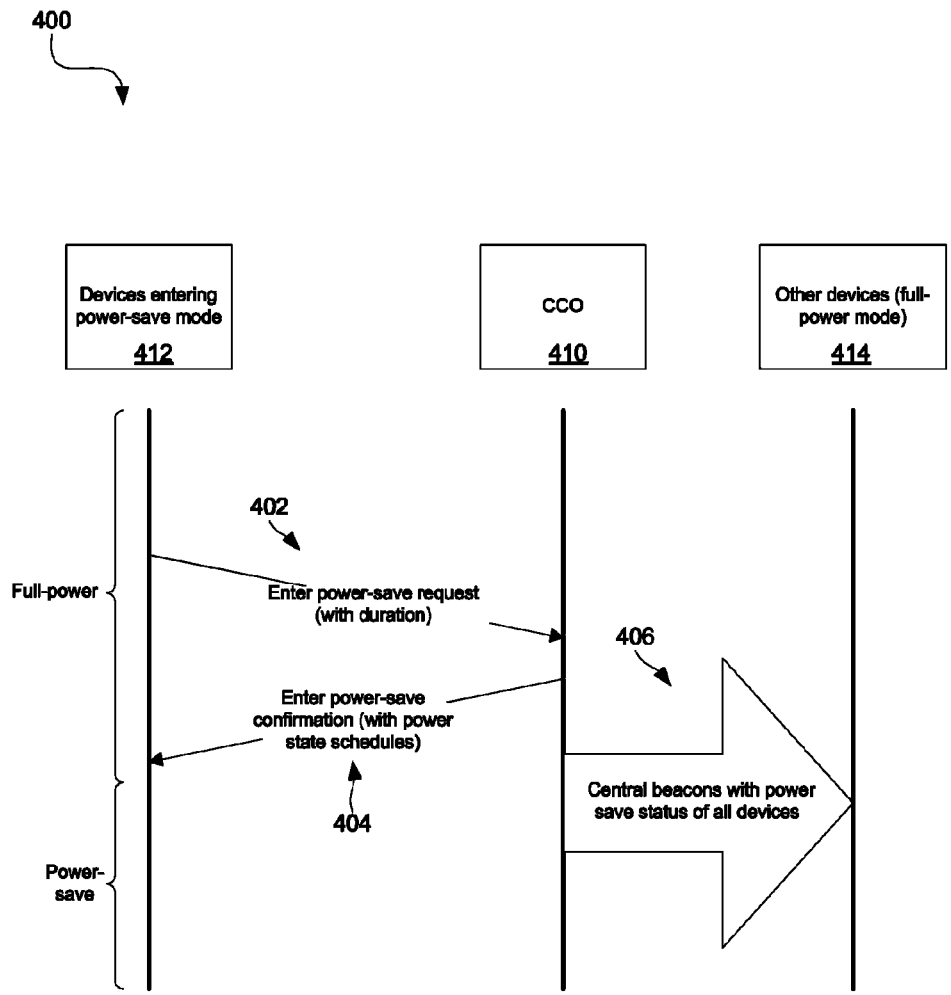
FIGS. 4-6 show message state sequence diagrams for communications devices.

The following sections describe one exemplary implementation of the network 100 in which the scheduling device 110 is the central coordinator (CCO) of a power line network. FIG. 4 shows a message state sequence diagram 400 for a device 412 entering a power-save mode. The exemplary power-save mode shown is standby mode and the devices are also referred to as stations. When a device 412 is about to enter coordinated power-save mode, it sends the CCO 410 an enter power-save request message 402 that includes its sleep state duration configuration.

Upon receiving this power-save request message 402, the CCO 410 then responds with an enter power-save confirmation message 404. The enter power-save confirmation message 404 has a status field that specifies whether or not the device 412 may enter the power-save mode or not. The enter power-save confirmation message 404 also includes power state schedules of devices already in power-save mode.

In this example, power state schedules of the devices are aligned by the CCO 410 to ensure the active states of the devices overlap, so that each device can scan for wake events from the other devices during regular intervals. The CCO 410 updates the power-save mode status of each device in a central beacon 406 that is transmitted to other devices 414 in a full-power mode.

Table 1 shows an example enter power-save request message format for power-save mode. Table 2 shows an example enter power-save confirmation message format. Table 3 shows an example of the device status broadcast in a central beacon from the CCO. Here, the power state schedules are also known as sleep schedules.

TABLE 1

Enter Power-Save Request

| Field | Octet Number | Field Size (Octets) | Definition |
| --- | --- | --- | --- |
| Sleep Duration | 0 | 4 | Sleep duration in Reference Time Units |

TABLE 2

Enter Power-Save Confirmation

| Field | Octet Number | Field Size (Octets) | Definition |
| --- | --- | --- | --- |
| Status | 0 | 1 | 0x00 = OK to go to power-save mode. 0x01 = Failure |
| Device Count | 1 | 1 | Number of devices that are in Power-save mode |
| Power-Save List[0] | 2 | 1 | Terminal ID of first device in Power-save mode |
| Sleep Time | 3 | 8 | Sleep start time (Absolute time) Reference Time Units |
| Sleep duration | 11 | 4 | Sleep duration in Reference Time Units |
| ... | | | |
| Power-Save List[N − 1] | | 1 | Terminal ID of last device in Power-save mode |
| Sleep Time | | 8 | Sleep start time (Absolute time) in Reference Time Units |
| Sleep duration | | 4 | Sleep duration in Reference Time Units |

TABLE 3

Network Power-Save Status

| Field | Octet Number | Field Size (Octets) | Definition |
|---|---|---|---|
| Power-Save Status | 0 | 32 | Bit 0 = reserved<br>Bit 1 = Terminal ID 1 Power-save Status<br>Bit 2 = Terminal ID 2 Power-save Status<br>...<br>Bit 254 = Terminal ID 254 Power-save Status<br>Bit 255 = reserved |

When a device enters coordinated power-save mode, it retains network topology information in order to activate later and scan for wake events efficiently. Table 4 contains exemplary information retained by non-CCO devices in the network. Table 5 contains exemplary information stored by the CCO. In some implementations, other information such as time stamps and expiry times may be retained or adjusted in order to synchronize periodic scan for wake events while in power-save mode.

TABLE 4

Example information retained by a non-CCO device that is about to enter coordinated power-save mode

| Data name | Reasons |
|---|---|
| Network Identifier | Able to communicate with powerline devices |
| Network key/Encryption key | Able to communicate with powerline devices |
| Authenticated Device List | Able to communicate with powerline devices |
| CCO MAC Address | Able to communicate with CCO |
| Association state | The association state |
| Local bridging table | Forward MAGIC packet/powerline packets from powerline to host |
| Remote bridging table | Forward MAGIC packet/Ethernet packets from host to powerline |
| MAC address table | Able to communicate with powerline devices |
| Sleep schedule table | Sleep schedules of those in Power-save mode |

TABLE 5

Example information stored by a CCO that is about to enter coordinated power-save mode

| Data name | Reasons |
|---|---|
| Network Identifier | Able to communicate with powerline devices |
| Network key/Encryption key | Able to communicate with powerline devices |
| Authenticated Device List | Able to communicate with powerline devices |
| Association state | The association state |
| Local bridging table | Forward MAGIC packet/powerline packets from powerline to host |
| Remote bridging table | Forward MAGIC packet/Ethernet packets from host to powerline |
| MAC address table | Able to communicate with powerline devices |
| Sleep schedule table | Sleep schedules of those in Power-save mode |
| Admission table | By pass association and authentication |

Figure 5:
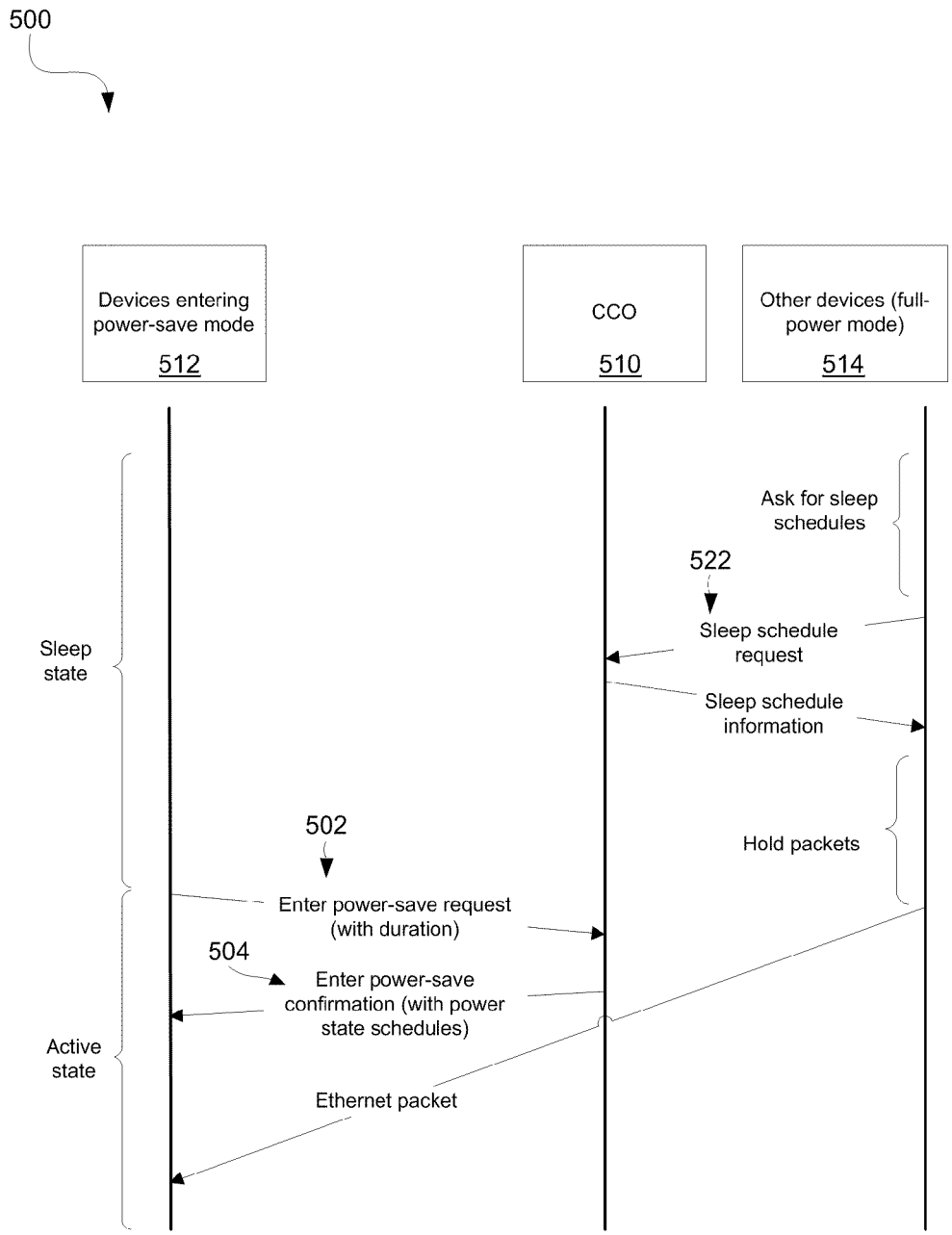

FIG. 5 shows a message state sequence diagram 500 for a device 512 operating in power-save mode. When the device 512 is in power-save mode and does not detect wake events during the active state periodic scan interval, it sends an enter power-save request message 502 to the CCO 510 that includes its power state schedule configuration. Here, the scheduling device 510 is a central coordinator device (CCO).

Upon receiving the enter power-save request message 502, the CCO 510 responds with enter power-save confirmation message 504. The enter power-save confirmation message 504 has a status field that specifies whether or not the device may remain in the power-save mode or not. The enter power-save confirmation message 504 also includes power state schedules of devices already in power-save mode. The CCO 510 updates the power-save status of each device in the central beacon.

Full-power devices 514 that are not in power-save mode maintain a record of the devices in power-save mode based on the central beacon information. When full-power devices 514 need to send a packet to devices 512 in power-save mode, they may first access the power state schedules. Power state schedules, also known as sleep schedules, may be obtained from the CCO 510 by a sleep schedule request message 522. Once the power state schedules are obtained, the full-power devices 514 may choose to hold packets until the destination device is in the active state in which the destination device performs a periodic scan.

In this example, the sleep schedule request message does not contain any data and Table 6 shows an example sleep schedule confirmation message format.

TABLE 6

Sleep Schedule Confirmation

| Field | Octet Number | Field Size (Octets) | Definition |
|---|---|---|---|
| Device Count | 0 | 1 | Number of devices that are in Power-save mode |
| Power-Save List[0] | 1 | 1 | Terminal ID of first device in Power-save mode |
| Sleep Time | 2 | 8 | Sleep start time (Absolute time) in Reference Time Units |
| Sleep duration | 10 | 4 | Sleep duration in Reference Time Units |
| ... | | | |
| Power-Save List[N − 1] | | 1 | Terminal ID of last device in Power-save mode |
| Sleep Time | | 8 | Sleep start time (Absolute time) in Reference Time Units |
| Sleep duration | | 4 | Sleep duration in Reference Time Units |

Figure 6:
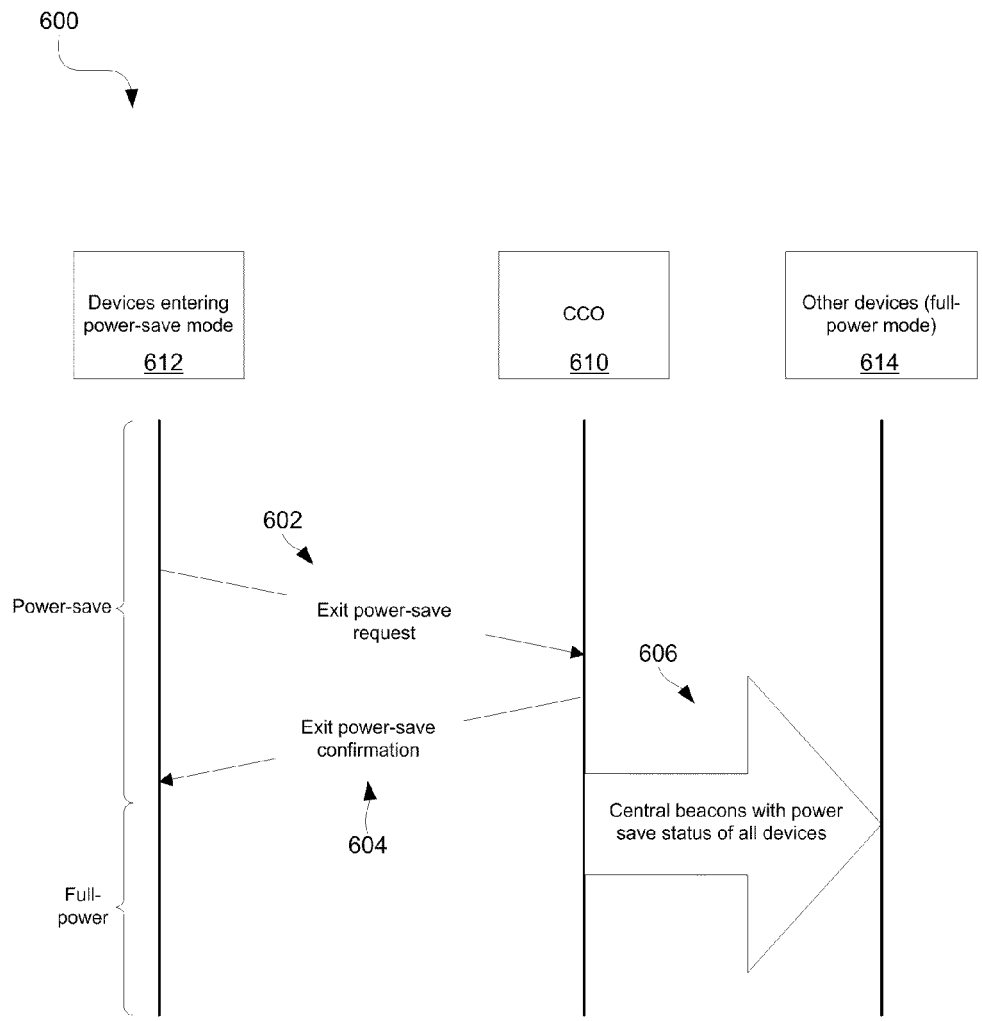

FIG. 6 shows a message state sequence diagram 600 for a communications device 612 exiting power-save mode. In this example, the communications device 612 is a power line communications station.

When a communications device 612 is about to exit a power-save mode, it first sends an exit power-save request message 602 to the CCO 610, which here is a CCO. Upon receiving the exit power-save request message 602, the CCO 610 then responds with an exit power-save confirmation message 604. The power-save confirmation message 604 also has the power state schedules of those devices that are in power-save mode. The CCO 610 also updates the power-save status indicating the power-save status of each communications device by its assigned identifier, e.g., a Terminal ID, network address, MAC address, or another kind of identifier, and sends the power-save status in the central beacons 606.

In this example, the exit power-save request message does not contain data and Table 7 shows an example exit power-save confirmation message format.

TABLE 7

Exit Power-Save Confirmation

| Field | Octet Number | Field Size (Octets) | Definition |
| --- | --- | --- | --- |
| Status | 0 | 1 | 0x00 = OK to go to power-save mode. 0x01 = Failure |
| Device Count | 1 | 1 | Number of devices that are in Power-save mode |
| Power-Save List[0] | 2 | 1 | Terminal ID of first device in Power-save mode |
| Sleep Time | 3 | 8 | Sleep start time (Absolute time) in Reference Time Units |
| Sleep duration | 11 | 4 | Sleep duration in Reference Time Units |
| ... | | | |
| Power-Save List[N − 1] | | 1 | Terminal ID of last device in Power-save mode |
| Sleep Time | | 8 | Sleep start time (Absolute time) in Reference Time Units |
| Sleep duration | | 4 | Sleep duration in Reference Time Units |

Figure 7:
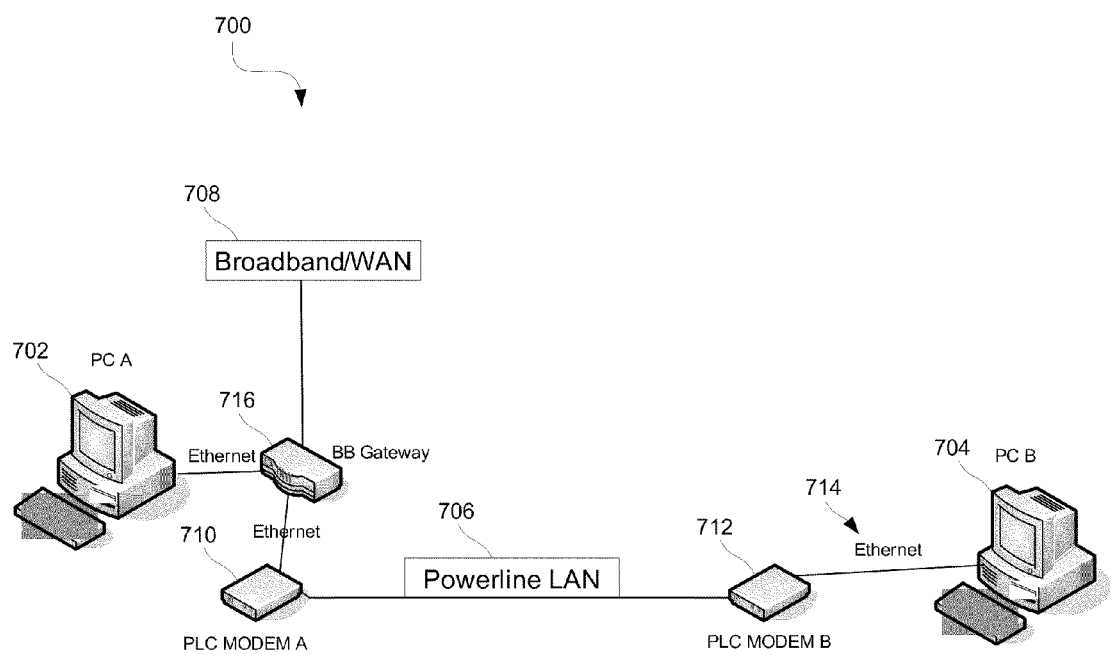
FIGS. 7-8 show communications networks and their associated components.

FIG. 7 shows an example of a network 700 having devices that operate in an uncoordinated power-save mode. This exemplary network 700 operates over power lines. PC A 702 and PC B 704 access the Internet through the powerline-based LAN connection 706 and a broadband/WAN connection 708 using a broadband gateway 716. PC A 702 and PC B 704 communicate through the powerline-based LAN connection 706. PLC MODEM A 710 is also a CCO with scheduling device functionality. If PC B 704 is switched off, PLC MODEM B 712 detects the Ethernet link 714 to PC B 704 is down and enters power-save mode without communicating any information to PLC MODEM A 710 (CCO).

Although PC A 702 cannot communicate with PC B 704 because PLC MODEM B 712 is in power-save mode, even if PLC MODEM B 712 was not in power-save mode, PC A 702 could not communicate with PC B 704 because it is switched off. When PC B 704 is switched on, PLC MODEM B 712 detects that the Ethernet link 714 to PC B 704 is up and exits power-save mode. PC B 704 is then able to access the Internet and communicate with PC A 702 over the powerline-based LAN connection 706.

Figure 8:
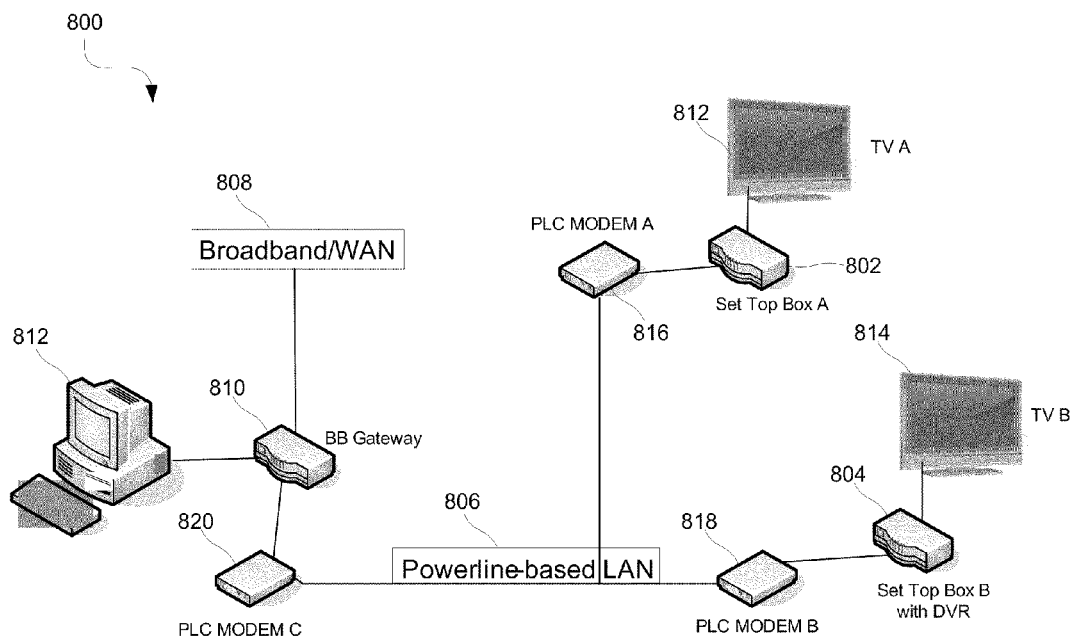

FIG. 8 shows an example of a network 800 having devices that operate in a coordinated power-save mode. This exemplary network 800 operates over power lines.

Set Top Box A 802 and Set Top Box B 804 receive Internet Protocol Television (IPTV) programming through a powerline-based LAN connection 806 and a broadband/WAN connection 808 using a broadband gateway 810. Set Top Box A 802 and Set Top Box B 804 stream media from PC A 812 through the powerline-based LAN connection 806. Set Top Box A 802 streams media from a digital video recorder (DVR) in Set Top Box B 804 even if TV B 814 is turned off. When TV A 812 or TV B 814 is switched off Set Top Box A 802 and Set Top Box B 804 enter power-save mode. In turn PLC MODEM A 816 and PLC MODEM B 818 can also enter power-save mode.

To provide the home-owner with a reasonable user experience when wanting to watch TV, which may include the use of any of the aforementioned sources, periodically PLC MODEM A 816 and PLC MODEM B 818 check for wake events that come from either the connections to their respective Set Top Boxes 802, 804 or from the powerline-based LAN connection 806. For example, the home-owner may wish to watch content from the DVR in Set Top Box B 804 on TV A 812. TV A 812 is switched on, in turn Set Top Box A 802 exits power-save mode. In turn PLC MODEM A 816 exits power-save mode. The devices don't necessarily have a priori knowledge of which video source the home-owner will select and therefore all devices are able exit power-save mode at the same time. In this example, all devices are configured with a common response time. The CCO ensures all devices are synchronized so they check for wake events at the same time. In this example, the CCO could be any of the devices, such as the broadband gateway 810, another PLC MODEM such as PLC MODEM C 820, or any other device with scheduling device functionality. The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

In all examples, the network can be any of several types of networks, such as a network with a mesh topology, a network with a star topology, or another kind of network.

Many other implementations of the invention other than those described above are within the invention, which is defined by the following claims.

What is claimed is:

1. A method for controlling a power state of a communications devices, the method comprising:
   receiving, over a network at a first communications device from a scheduling device, an indication of a power state schedule of a second communications device, the power state schedule indicating one or more intervals for the second communications device to enter an active state period and one or more intervals to enter a sleep state period while the second communications device is in a low-power mode, wherein the low-power mode at least includes an active state and a sleep state;
   determining when the second communications device is in the active state period based, at least in part, on the power state schedule; and
   transmitting over the network to the second communications device, when the second communications device is in the active state period as determined based on the power state schedule, a request that the second communications device exits the low-power mode.

2. The method of claim 1, in which an active state period of the first communications device overlaps with an active state period of the second communications device.

3. The method of claim 1, in which the second communications device has been assigned the power state schedule by the scheduling device.

4. The method of claim 1, in which an indicated maximum response time is equal to a sum of the active state period and the sleep state period.

5. The method of claim 1, in which a length of the active state period is based, at least in part, on an indicated level of power consumption.

6. The method of claim 1, further comprising sending from the first communications device to the scheduling device an indication that the first communications device is entering the low-power mode.

7. The method of claim 1, wherein the power state schedule also indicates one or more intervals for a third communications device to enter an active state period and one or more intervals to enter a sleep state period while in the low-power mode.

8. The method of claim 1, further comprising receiving at the first communications device an indication from the scheduling device of the active state period of a third communications device on the network.

9. The method of claim 1, further comprising, at the scheduling device, determining that all communications devices associated with the scheduling device have entered a sleep state period.

10. The method of claim 9, wherein said determining that all communications devices associated with the scheduling device have entered the sleep state period is based, at least in part, on uncoordinated power state schedules assigned to the communications devices.

11. The method of claim 9, further comprising, at the scheduling device, exiting the sleep state period when a communications device exits a sleep state period.

12. The method of claim 1, further comprising, at a third communications device, entering the low-power mode based, at least in part, on an event other than a network communication from the scheduling device.

13. The method of claim 12, in which the event is receipt of a network communication from another communications device, which is not the scheduling device, indicating that the other communications device has entered the low-power mode.

14. A network, comprising:
   a scheduling device configured to transmit a power state schedule to communications devices communicatively coupled with the scheduling device, wherein the power state schedule indicates, for each of the communications devices, one or more intervals to enter an active state and one or more intervals to enter a sleep state while the communications device is in a low-power mode, wherein the low-power mode at least includes the active state and the sleep state;
   a first of the communications devices configured to, receive the power state schedule,
      operate in accordance with the power state schedule;
      determine, in preparation for communicating with a second of the communications devices, when the second communications device is in the active state of the low-power mode according to the power state schedule;
      when the second communications device is in the active state of the low-power mode according to the received power stated schedule, send to the second communications device a request that the second communications device exits the low-power mode; and
      communicate with the second communications device based, at least in part, on a confirmation from the second communications device that the second communications device has exited the low-power mode;
   the second communications device configured to,
      receive the power state schedule from the scheduling device,
      operate in accordance with the power state schedule,
      receive from the first communications device, while in the active state of the low-power mode, the request that the second communications device exits the low-power mode,
      exit the low power mode, and
      send the confirmation to the first communications device that the second communications device has exited the low-power mode.

15. A non-transitory computer readable storage medium having a program for controlling a power state of a communications device, the program comprising program code to:
   determine, in preparation for communicating with a communication device of a plurality of communications devices, when the communications device is in an active state of a low-power mode according to a received power state schedule that indicates, for each of the plurality of communications devices, one or more times when to enter an active state and one or more times when to enter a sleep state while in the low-power mode, wherein the low-power mode at least includes the active state and the sleep state;
   when the communications device is in the active state of the low-power mode according to the received power state schedule, send to the communications device a request that the communications device exits the low-power mode; and
   communicate with the communications device based, at least in part, on a confirmation from the communications device that the communications device has exited the low-power mode.

16. The non-transitory computer readable storage medium of claim 15, wherein the program further comprises program code to request the power state schedule from a scheduling device in a network associated with the plurality of communications devices.

17. The non-transitory computer readable storage medium of claim 15, wherein the received power state schedule indicates uncoordinated times across the plurality of communications devices for entering the active state and the sleep state while in the low-power mode.

18. The method of claim 1 further comprising communicating with the second communications device after receiving confirmation from the second communications device that the second communications device has exited the low-power mode.

19. The network of claim 14, wherein the power state schedule indicates uncoordinated times across the communications devices for entering the active state and the sleep state while in the low-power mode.

\* \* \* \* \*